(12) United States Patent
Kaliyamoorthy et al.

(10) Patent No.: US 11,641,374 B2
(45) Date of Patent: May 2, 2023

(54) DETERMINE A TRUSTED DYNAMIC HOST CONFIGURATION PROTOCOL (DHCP) SERVER IN A DHCP SNOOPING ENVIRONMENT

(71) Applicant: DELL PRODUCTS L.P., Round Rock, TX (US)

(72) Inventors: Karthi Kaliyamoorthy, Chengalpattu (IN); Ramesh Ganapathi, Chennai (IN)

(73) Assignee: DELL PRODUCTS L.P., Round Rock, TX (US)

( * ) Notice: Subject to any disclaimer, the term of this patent is extended or adjusted under 35 U.S.C. 154(b) by 141 days.

(21) Appl. No.: 16/883,798

(22) Filed: May 26, 2020

(65) Prior Publication Data

US 2021/0377299 A1    Dec. 2, 2021

(51) Int. Cl.
  *H04L 9/40* (2022.01)
  *H04W 48/06* (2009.01)
  *H04L 61/5014* (2022.01)

(52) U.S. Cl.
  CPC ...... *H04L 63/1475* (2013.01); *H04L 61/5014* (2022.05); *H04L 63/101* (2013.01); *H04L 63/1416* (2013.01); *H04L 63/1483* (2013.01); *H04W 48/06* (2013.01)

(58) Field of Classification Search
  USPC .......................................................... 726/23
  See application file for complete search history.

(56) References Cited

U.S. PATENT DOCUMENTS

| | | | | |
|---|---|---|---|---|
| 8,316,438 | B1* | 11/2012 | Bush | H04L 12/66 726/22 |
| 8,615,582 | B2* | 12/2013 | McClure | H04L 63/1433 709/200 |
| 9,888,375 | B2* | 2/2018 | Zisimopoulos | H04W 8/12 |
| 10,587,605 | B2* | 3/2020 | Mistry | H04L 61/5014 |
| 2006/0036733 | A1* | 2/2006 | Fujimoto | H04L 67/14 709/225 |
| 2007/0204330 | A1* | 8/2007 | Townsley | H04L 61/5014 726/4 |
| 2009/0210518 | A1* | 8/2009 | Verma | H04L 61/103 709/220 |
| 2012/0084415 | A1* | 4/2012 | Hu | H04W 12/06 709/221 |
| 2014/0162606 | A1* | 6/2014 | Cherian | H04L 9/0869 455/411 |

(Continued)

FOREIGN PATENT DOCUMENTS

| | | | | |
|---|---|---|---|---|
| CN | 105812502 A | * | 7/2016 | H04L 61/103 |
| EP | 2214383 B1 | * | 12/2018 | H04L 61/2015 |

*Primary Examiner* — Sakinah White Taylor
(74) *Attorney, Agent, or Firm* — North Weber & Baugh LLP

(57) ABSTRACT

Presented herein are systems and methods to determine whether a dynamic host configuration protocol (DHCP) server in DHCP snooping environment is a trusted device without requiring trusted port configuration. In one or more embodiments, a DHCP snooping-enable switch/router adds an indicator to a message intended for a DHCP server, thereby notifying the DHCP server that the DHCP switch/router is enabled for or capable of "detection of trusted DHCP server." The DHCP server includes a unique trusted identifier in its reply that the DHCP switch/router uses to verify whether the DHCP server can be considered a trusted device.

20 Claims, 8 Drawing Sheets

(56) References Cited

U.S. PATENT DOCUMENTS

| | | | |
|---|---|---|---|
| 2017/0188224 A1* | 6/2017 | Weniger | H04L 63/029 |
| 2019/0052467 A1* | 2/2019 | Bettger | H04L 9/088 |
| 2019/0174451 A1* | 6/2019 | Bouvet | H04L 61/5053 |
| 2021/0211404 A1* | 7/2021 | Pandey | H04L 61/103 |

* cited by examiner

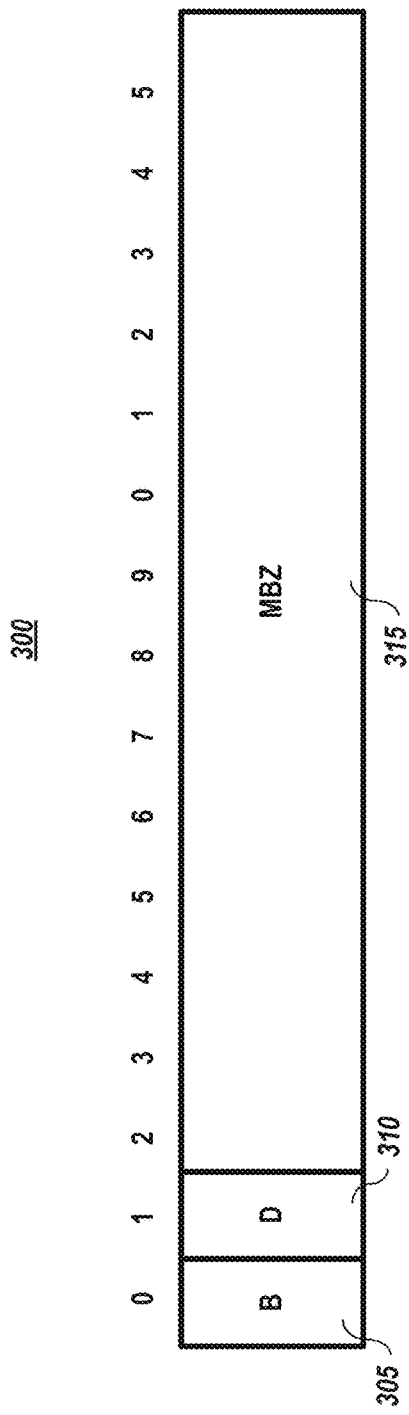

| 500 | | | |
|---|---|---|---|
| OP | HTYPE | HLEN | HOPS |
| Transaction ID 505 | | | |
| Seconds | | FLAGS | |
| Client IP Address | | | |
| Your IP Address | | | |
| Server IP Address | | | |
| Router IP Address | | | |
| Client Hardware Address (16 Octets) | | | |
| Server Host Name (64 Octets) | | | |
| Boot File Name (128 Octets) | | | |
| Option (Variable) 510 | | | |

DETERMINE A TRUSTED DYNAMIC HOST CONFIGURATION PROTOCOL (DHCP) SERVER IN A DHCP SNOOPING ENVIRONMENT

BACKGROUND

The present disclosure relates generally to information handling systems. More particularly, the present disclosure relates to systems and methods for determining a trusted Dynamic Host Configuration Protocol (DHCP) server in a DHCP snooping environment.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As the size and complexity of networks grow so does the amount of effort to properly configure of the information handling systems of the networks. Correct configuration is not only important for the information handling systems, and ultimately the networks, to function properly, but it can be extremely important for security of the network. Improperly configured information handling systems can leave a network vulnerable to number of attacks.

Potential vulnerabilities exist when a rogue device is granted access or operates in an important role in a network. One example of such a scenario is a rogue DHCP server. A rogue DHCP server is a server that is not under the control of the system administrator but is under the control of a nefarious party. If client devices connect to the rogue DHCP server instead of a trusted DHCP server, the nefarious party controlling the rogue DHCP server can supply Internet Protocol (IP) addresses and a default gateway address to the clients that will make the clients susceptible to security attacks, such as a "man-in-the-middle attack." A man-in-the-middle attack allows a nefarious party in control of the rogue DHCP server to direct client traffic to a default gateway controlled by that nefarious party, wherein it can sniff all the traffic sent by the clients to other networks. This attack, along with other security breaches are extremely severe and troublesome.

Accordingly, it is highly desirable to find improved ways to verify whether a DHCP server is a trusted or a rogue device.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may be not to scale.

FIG. 3 graphically depicts a flag field in a packet, according to embodiments of the present disclosure.

FIG. 4 depicts a Type-Length-Value (TLV) configuration for including a unique trusted identifier value in a packet, according to embodiments of the present disclosure.

FIG. 5 graphically depicts a DHCP message structure with new DHCP option field and flag, according to embodiments of the present invention.

DETAILED DESCRIPTION OF THE PREFERRED EMBODIMENTS

Figure 1:
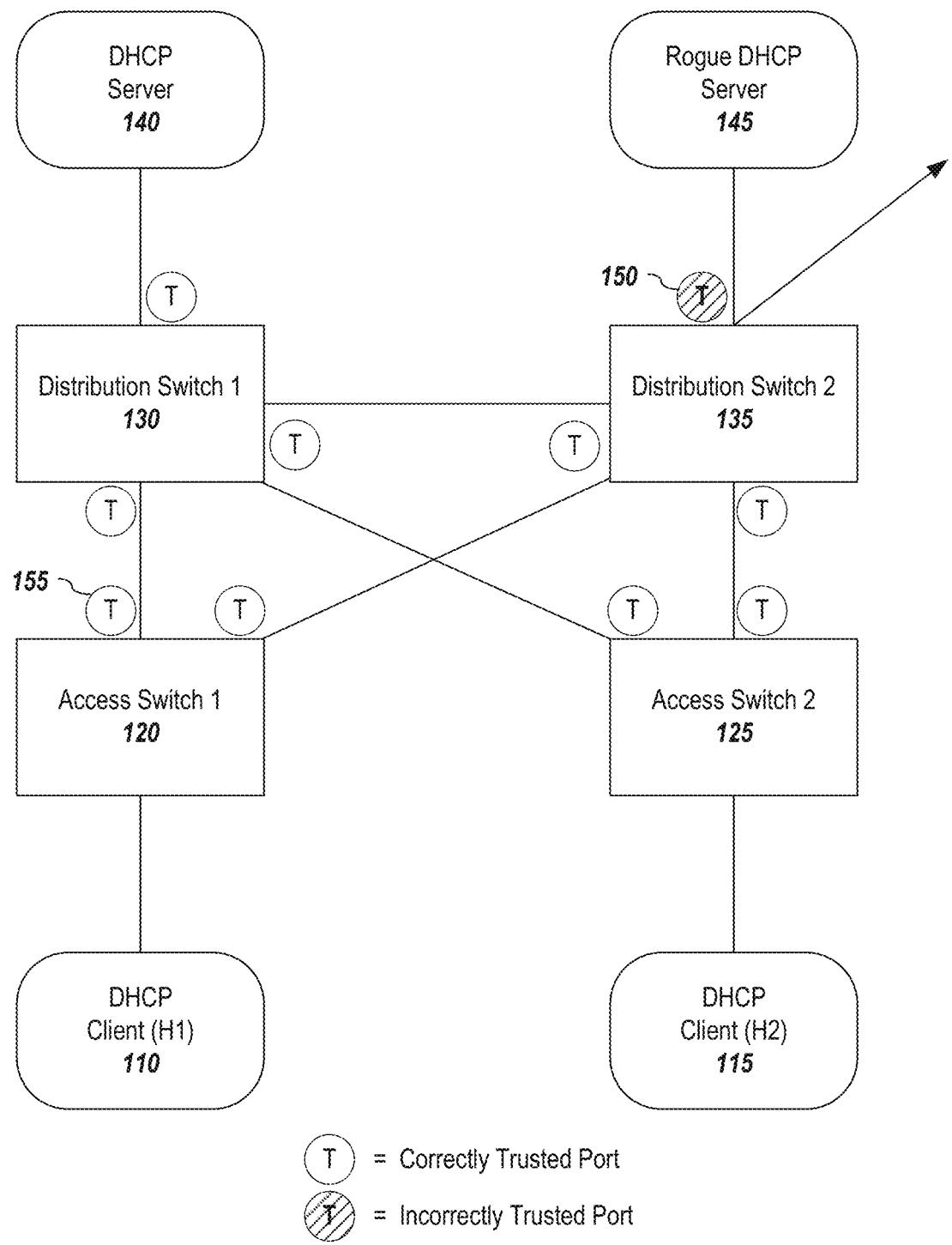
FIG. 1 ("FIG. 1") depicts a network topology, according to embodiments of the present disclosure.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledge, message, query, etc., may comprise one or more exchanges of data.

Reference in the specification to "one embodiment," "preferred embodiment," "an embodiment," or "embodiments" means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," and "comprising" shall be understood to be open terms and any lists the follow are examples and not meant to be limited to the listed items.

A service, function, or resource is not limited to a single service, function, or resource; usage of these terms may refer to a grouping of related services, functions, or resources, which may be distributed or aggregated. The use of memory, database, information base, data store, tables, hardware, and the like may be used herein to refer to system component or components into which information may be entered or otherwise recorded. The terms "data," "information," along with similar terms may be replaced by other terminologies referring to a group of one or more bits, and may be used interchangeably. The terms "packet" or "frame" shall be understood to mean a group of one or more bits. The term "frame" shall not be interpreted as limiting embodiments of the present invention to Layer 2 networks; and, the term "packet" shall not be interpreted as limiting embodiments of the present invention to Layer 3 networks. The terms "packet," "frame," "data," or "data traffic" may be replaced by other terminologies referring to a group of bits, such as "datagram" or "cell." The words "optimal," "optimize," "optimization," and the like refer to an improvement of an outcome or a process and do not require that the specified outcome or process has achieved an "optimal" or peak state.

It shall be noted that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. Each reference/document mentioned in this patent document is incorporated by reference herein in its entirety.

It shall also be noted that although embodiments described herein may be within the context of DHCP servers and switches/routers, aspects of the present disclosure are not so limited. Accordingly, the aspects of the present disclosure may be applied or adapted for use in other contexts.

A. General Introduction

In DHCP snooping deployments, currently a system administrator has to manually configure trusted ports in the intermediate DHCP snooping-enabled switches or routers to make successful DHCP packet forwarding between client and server. There is not currently support for automatic detection of trusted servers in DHCP snooping deployments.

This manual configuration creates a number of problems. Consider, by way of example, a situation in which the network topology changes. In such cases, administrator intervention is required when network topology changes (e.g., device changes, changes in configuration, path changes, new links added/removed, etc.).

Despite the best efforts of administrators, manual configuration can be error prone. Misconfiguration of trusted ports may lead to a rogue DHCP server providing IP addresses to the DHCP client. Consider, by way of illustration, FIG. 1, which depicts a network topology 100. In the depicted example, a number of ports have been manually configured to be trusted ports. Each trusted port is designated with a "T" in a circle (e.g., trusted port 155). In the depicted example, port 150 has been designated as trusted but should not have been so designated. That port connects to a rogue DHCP sever 145. As a result, the network is now susceptible to network attacks such as man-in-the-middle attacks, sniffing, and reconnaissance attacks.

When one considers that a typical datacenter environment comprises hundreds of top-of-rack (TOR) switches/routers that are deployed and must be configured, it is clear that the current methodology of configurating trusted ports manually is overwhelmingly tedious, burdensome, and error prone. Thus, aspects of the present disclosure help alleviate the significant administrative burden and help mitigate security risks.

Aspects of the present disclosure involve automatic detection of trusted DHCP server can be accomplished without trusted port/trusted server configuration. In one or more embodiments, automatic detection of a trusted DHCP server is capable by enhancing the DHCP packet flag field and adding a new option to ensure legitimacy of the DHCP server. It should be noted that one or more embodiments of the present disclosure help verify a DHCP server legitimacy even after a change in network.

One skilled in the art shall recognize a number of benefits from embodiments of the present disclosure. These benefits include, but are not limited to: (1) DHCP server legitimacy is ensured automatically for any network topology change without manual intervention; (2) reduce burden on administrators; and (3) preventing human error in trusted DHCP server or trusted port configuration, which results in decreased security risks.

B. Trusted DHCP Server Verification Embodiments

Figure 2:
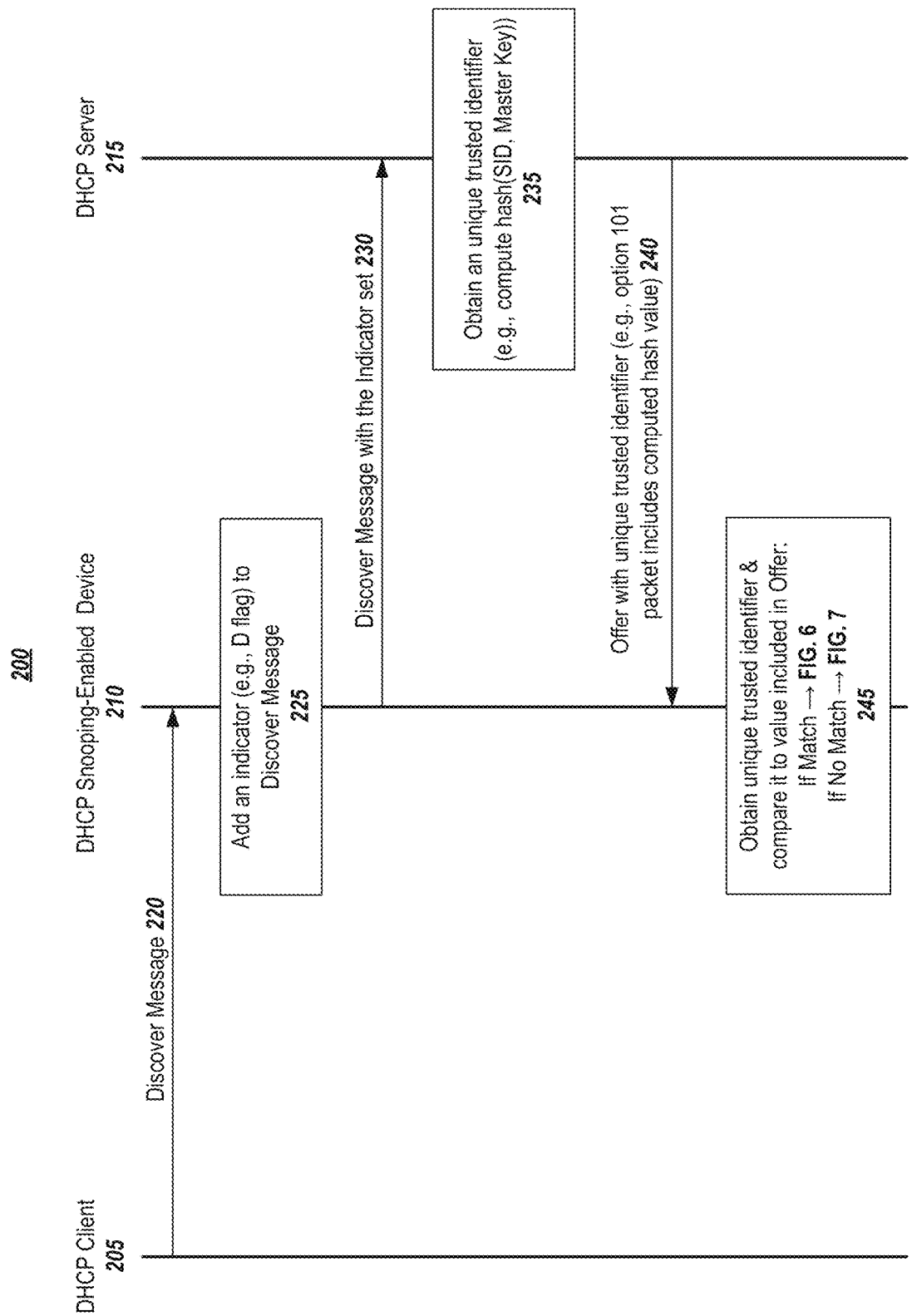
FIG. 2 depicts a method to enable a DHCP snooping switch/router to perform detection of whether a DHCP server is a trusted device, according to embodiments of the present disclosure.

FIG. 2 depicts a method to enable a DHCP snooping-enabled information handling system (e.g., a switch, a router, or an information handling system that performed functions related to both switching and routing) to perform detection to determine whether a DHCP server is a trusted device, according to embodiments of the present disclosure. In the depicted embodiment, a DHCP client 205 sends (220) a DHCP discover message to a DHCP snooping-enabled switches/routers 210. To facilitate detection of a trusted DHCP server, the DHCP snooping device 210 adds (225) an indicator to the discover message from the DHCP client 205 and sends (230) DHCP discover message with the indicator set to the DHCP server 215.

In one or more embodiments, the indicator may be an enhancement to the "flags" field in a DHCP packet. For example, in one or more embodiments, a new bit may be set to indicate that the receiving DHCP server should perform steps to facilitate detection or verification of the trusted DHCP server.

FIG. 3 graphically depicts a new flag field for indicating that trusted DHCP server verification should be performed, according to embodiments of the present disclosure. In the depicted example, certain fields may already be present in the DHCP packet, such as the "Broadcast" flag 305. However, in the depicted embodiment, a new flag—the D flag 310 (representing "Detection of Trusted DHCP Server Capability")—is designed. In one or more embodiments, the "D" bit may be set to 1 by the DHCP snooping-enabled switch/router 210 when forwarding the DHCP packet towards the DHCP server 215 to indicate to the server 215 to perform steps to verify that it is a trusted device, which steps will be explained in more detail below. It should be noted that the portion of the packet 300 that is depicted in FIG. 3 also shows the "Must Be Zero" field 315, which may be reserved for setting other flags or for other purposes. One skilled in the art shall recognize other ways to communicate usage of the verification process between the devices, which methods fall within the scope of the present disclosure.

Returning to FIG. 3, upon receiving the DHCP discover message from the DHCP snooping-enabled device, the DHCP server 215 check the flag field. Upon recognizing that the "D" flag field has been set to 1, the DHCP server will obtain (235) a unique trusted identifier. In one or more embodiments, the DHCP server 215 may generate (235) the unique trusted identifier by computing a hash. In one or more embodiments, the hash may be computed using a pre-set hash function and a master key, each of which have been provisioned by an administrator to the DHCP server. In one or more embodiments, the hash may also receive one or more other pieces of data as input. For example, in embodiments, the inputs to the set hash function may be the master key and the unique server identifier (SID), which may be an identifier assigned as part of the server's configuration or provisioning, or may be the IP address of the DHCP server. In embodiments, each DHCP server in the network is identified uniquely by the server-identifier (SID) field in the DHCP packet.

As shown in FIG. 3, the DHCP server 215 includes (240) the unique trusted identifier in its reply, in this example a DHCP offer message. In one or more embodiments, the DHCP server 215 may also clear the indicator flag (e.g., the "D" flag) on sending the DHCP reply packet. In one or more embodiments, the DHCP server includes the unique trusted identifier in newly defined option of the DHCP reply packet.

FIG. 4 depicts a Type-Length-Value (TLV) configuration 400 for including a unique trusted identifier value in a packet, according to embodiments of the present disclosure. In the depicted embodiment, the new DHCP option, option 101 (although another number may be assigned to identify the option) 405, of length n 410 is used to carry unique trusted identifier value 415 in the DHCP packet from the DHCP server. As noted above, in embodiments, the unique trusted identifier value may be a computed hash value.

FIG. 5 graphically depicts a DHCP message structure 500 with new DHCP option field and flag, according to embodiments of the present invention. As shown in the depicted embodiments, the DHCP message 500 includes a FLAGS field 505 that is enhanced to include the "D" bit for the DHCP server to detect that performance of the detection of trusted DHCP server is enabled, and the options field 510 to include the new option 101 for sharing the unique trusted identifier value by the DHCP server.

Returning to FIG. 3, upon receiving the DHCP offer message from the DHCP server 215, the DHCP snooping-enabled device 210 checks that the received message includes a unique trusted identifier in option field. If the message includes the unique trusted identifier, the DHCP snooping-enabled device 210 verifies if the unique trusted identifier is valid. In one or more embodiments, the DHCP device 210 either knows via provisioning or configuration or generates (245) the unique trusted identifier.

In one or more embodiments, to facilitate the verification, the DHCP snooping-enabled device and the DHCP server are provisioned with the same master key (MK) and hash function. In one or more embodiments, they will also be configured to know what types of information need to be input into the hash function; that is, if additional data is required as an input and what type of information it is (e.g., the SID). It should be noted that administrator tools for provisioning may be used to help automate the process of provisioning all appropriate trusted devices in the network with this information. Given the hash information, the master key, and the SID from the packet, the DHCP snooping-enabled device can duplicate the hash generation done by the DHCP server. If there is a match, the DHCP snooping-enabled device knows that the DHCP server is a trusted device and will continue processing; otherwise, the DHCP snooping-enabled switch treats the DHCP server as an untrusted or rogue server and may take one or more actions to protect the network.

Figure 6:
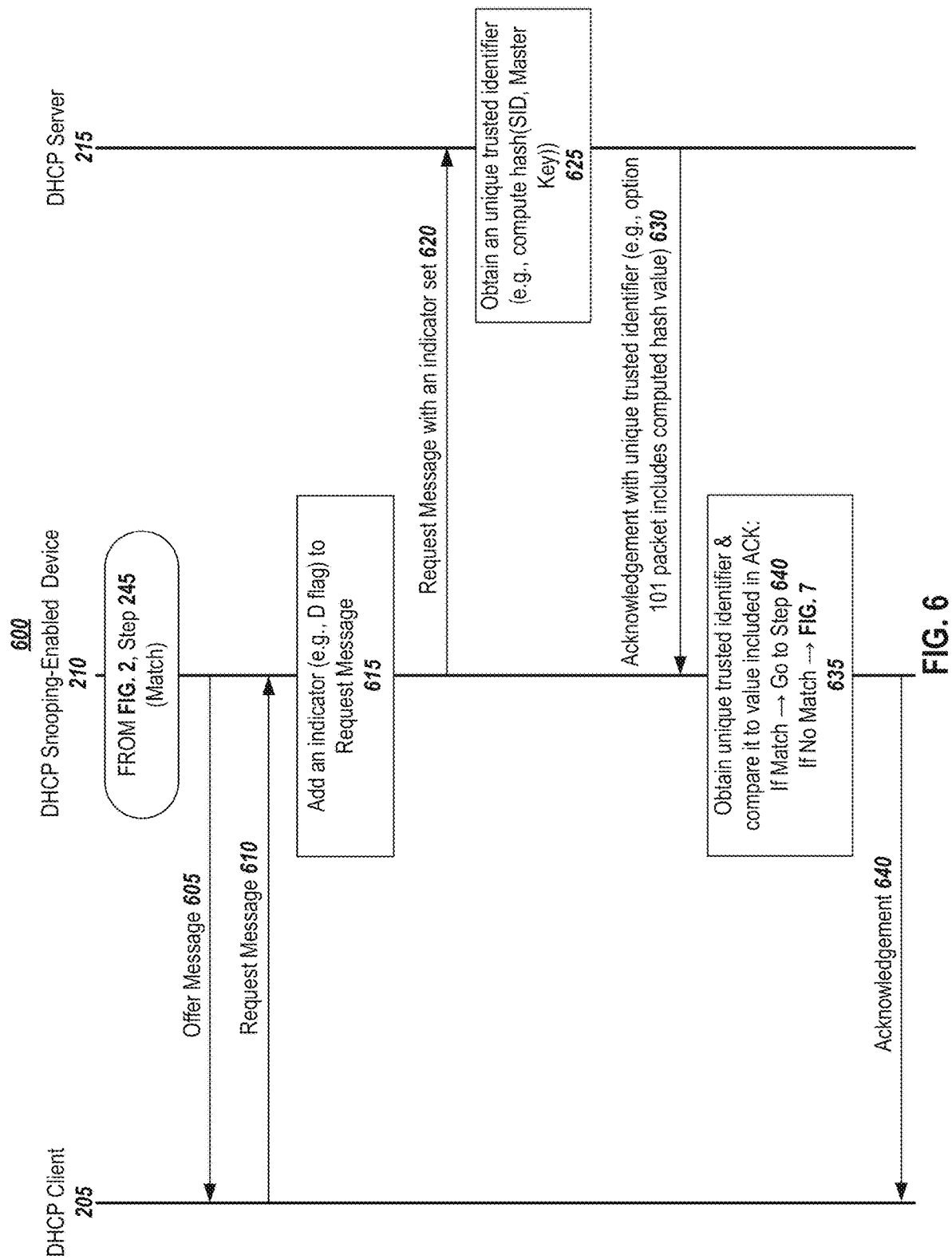
FIG. 6 depicts an example method flow when DHCP server is verified as being trusted, according to embodiments of the present disclosure.

FIG. 6 depicts an example method flow when DHCP server indicates as being trusted, according to embodiments of the present disclosure. In one or more embodiments, given that the DHCP server 215 is trusted, the DHCP snooping-enabled device 210 will forward the DHCP offer message 605 (which may include removing the unique trusted identifier in the option 101 field), which includes the IP address for the DHCP client from the DHCP server.

In one or more embodiments, once trusted, the DHCP snooping-enabled device 210 may not utilize the verification process again for that DHCP server or may only use it upon one or more different triggers/conditions, such as: according to a verification schedule; as a result of a changing in the network; power-up/reboot of the DHCP snooping-enabled device 210; update of the DHCP snooping-enabled device 210; using the verification process with each communication (or a subset thereof) with the DHCP server; etc. FIG. 6 illustrates further communications in which the DHCP client 205 sends (610) a request message (e.g., a DHCP request message). In similar manner as depicted in FIG. 2, the DHCP snooping-enabled device 210 adds (615) an indicator to the message and forwards the message to the DHCP server 215 with the indicator flag set.

Upon receiving the DHCP request message from the DHCP snooping-enabled device, the DHCP server 215 check the indicator field. Upon recognizing that the indicator field has been set to require trusted verification, the DHCP server obtains (625) a unique trusted identifier. In one or more embodiments, the DHCP server 215 may generate (235) the unique trusted identifier by computing a hash. To make the hash different from the prior hash, the hash function may require another input for this communication. For example, besides using the master key and the SID, the hash may also use a set or sequence of data in the packet itself that is known, like the master key, by only trusted devices. In any event, the unique trusted identifier is obtained or generated (625), included in the option field of the reply packet (in this example, an acknowledgement packet), which is sent (630) to the DHCP snooping-enabled device 210. In one or more embodiments, the DHCP server clears the indicator flag in the reply packet.

As before, the DHCP snooping-enabled device receives the reply packet, obtains its own version of the unique trusted identifier, and verifies (635) it against what was received from the DHCP server 215. If the unique trusted identifier values match, the DHCP switch 210 forwards (640) acknowledge message (e.g., a DHCP ACK message) to the DHCP client 205. In one or more embodiments, the DHCP switch 210 removes the unique trusted identifier value before forwarding the acknowledgement message.

Figure 7:
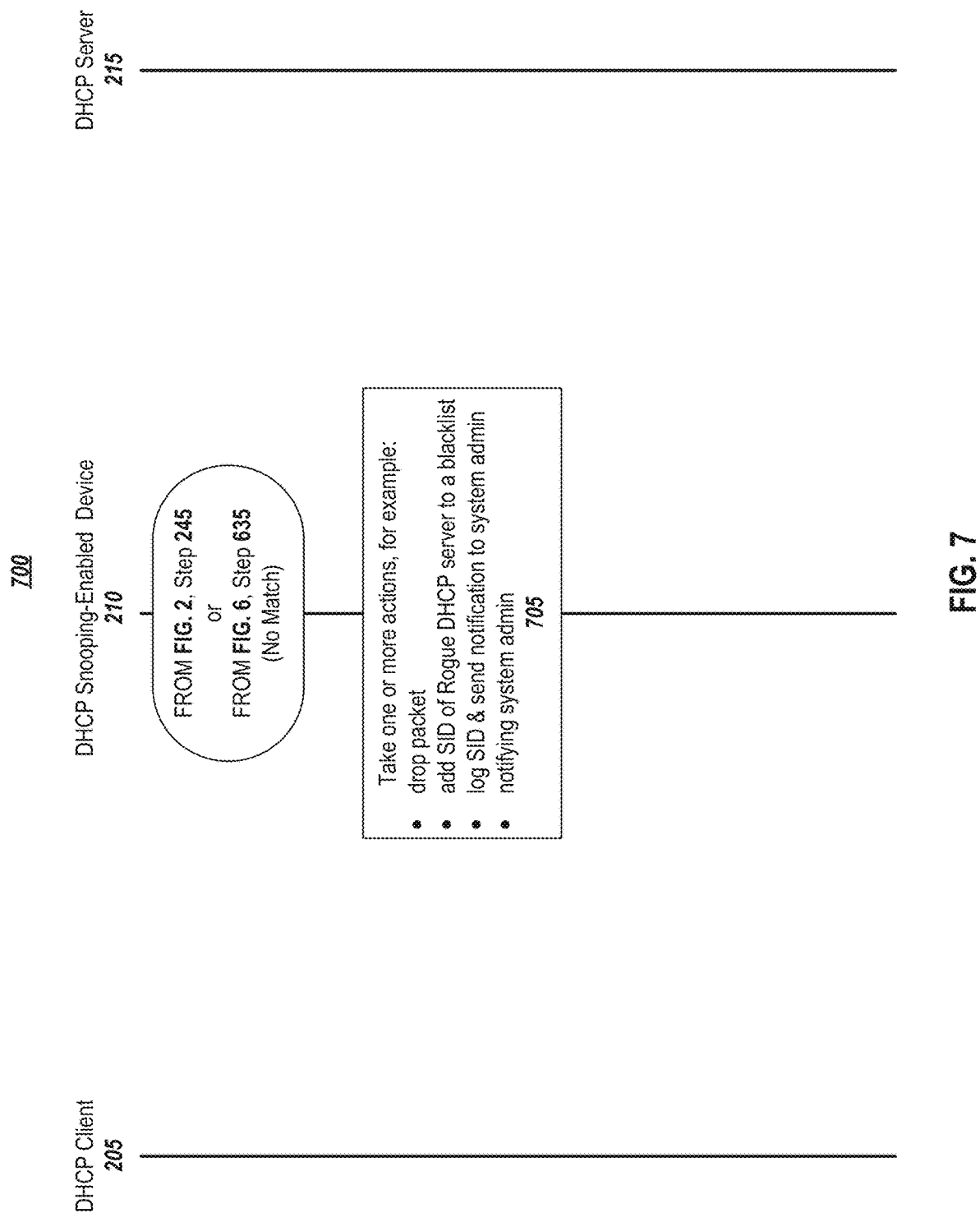
FIG. 7 depicts example method flows when DHCP server is not verified as being trusted, according to embodiments of the present disclosure.

If there is not a match, the DHCP snooping-enabled switch treats the DHCP server as an untrusted or rogue server and may take one or more actions to protect the network. FIG. 7 depicts examples of method flows when DHCP server is not verified as being trusted, according to embodiments of the present disclosure.

As shown in FIG. 7, the DHCP snooping-enabled device may take one or more actions (705). Those actions may include one or more of the following: dropping the packet received from the untrusted DHCP server, adding the DHCP server to a blacklist (e.g., adding its SID or IP address to a blacklist), logging the SID of the DHCP server, creating an Access Control List (ACL) related to the untrusted DHCP server, triggering an alarm, and notifying the system administrator. In any event, the network system is more secure than typical networks with no such verification processes.

C. System Embodiments

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, phablet, tablet, etc.), smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read only memory (ROM), and/or other types of memory. Additional components of the computing system may include one or more disk drives, one or more network ports for communicating with external devices as well as various input and output (I/O) devices, such as a keyboard, mouse, stylus, touchscreen, and/or video display. The computing system may also include one or more buses operable to transmit communications between the various hardware components.

Figure 8:
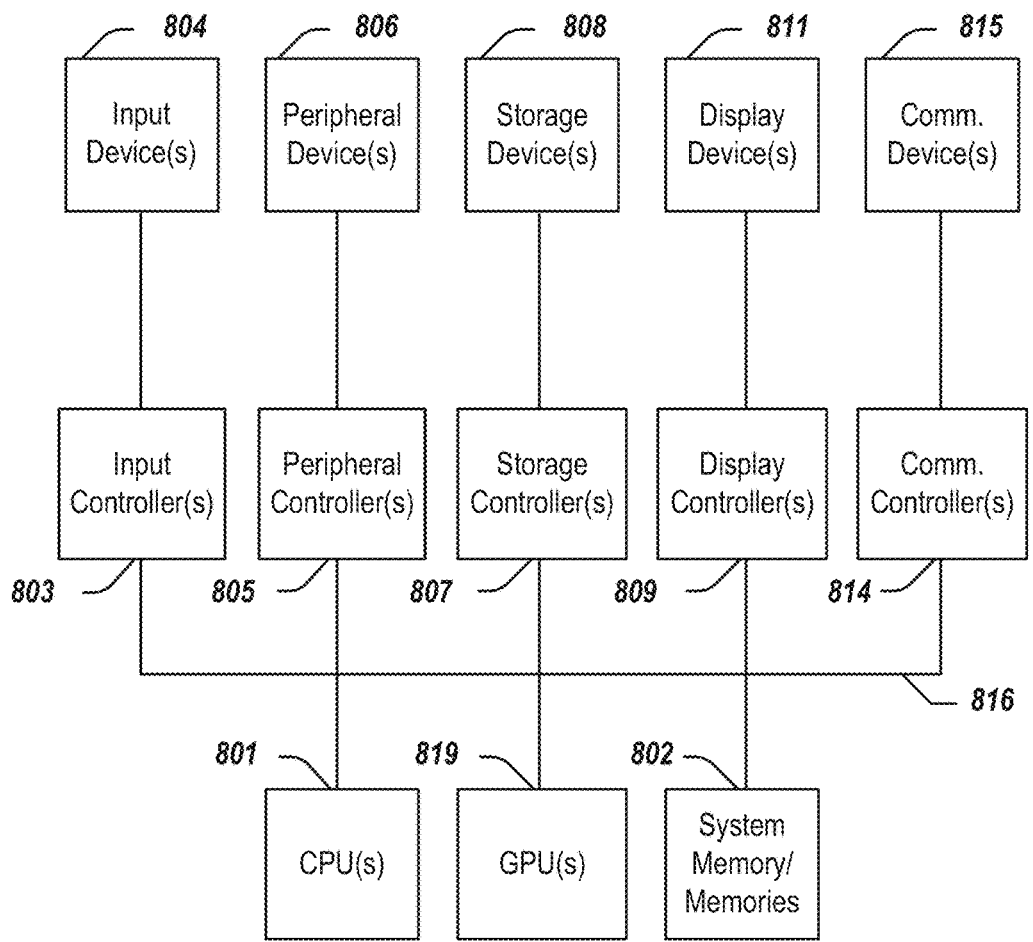
FIG. 8 depicts a block diagram of an information handling system, according to embodiments of the present disclosure.

FIG. 8 depicts a simplified block diagram of an information handling system (or computing system), according to embodiments of the present disclosure. It will be understood that the functionalities shown for system 800 may operate to support various embodiments of a computing system—although it shall be understood that a computing system may be differently configured and include different components, including having fewer or more components as depicted in FIG. 8.

As illustrated in FIG. 8, the computing system 800 includes one or more central processing units (CPU) 801 that provides computing resources and controls the computer. CPU 801 may be implemented with a microprocessor or the like, and may also include one or more graphics processing units (GPU) 819 and/or a floating-point coprocessor for mathematical computations. In one or more embodiments, one or more GPUs 819 may be incorporated within the display controller 809, such as part of a graphics card or cards. The system 800 may also include a system memory 802, which may comprise RAM, ROM, or both.

A number of controllers and peripheral devices may also be provided, as shown in FIG. 8. An input controller 803 represents an interface to various input device(s) 804, such as a keyboard, mouse, touchscreen, and/or stylus. The computing system 800 may also include a storage controller 807 for interfacing with one or more storage devices 808 each of which includes a storage medium such as magnetic tape or disk, or an optical medium that might be used to record programs of instructions for operating systems, utilities, and applications, which may include embodiments of programs that implement various aspects of the present disclosure. Storage device(s) 808 may also be used to store processed data or data to be processed in accordance with the disclosure. The system 800 may also include a display controller 809 for providing an interface to a display device 811, which may be a cathode ray tube (CRT) display, a thin film transistor (TFT) display, organic light-emitting diode, electroluminescent panel, plasma panel, or any other type of display. The computing system 800 may also include one or more peripheral controllers or interfaces 805 for one or more peripherals 806. Examples of peripherals may include one or more printers, scanners, input devices, output devices, sensors, and the like. A communications controller 814 may interface with one or more communication devices 815, which enables the system 800 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 816, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, for example: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Figure 9:
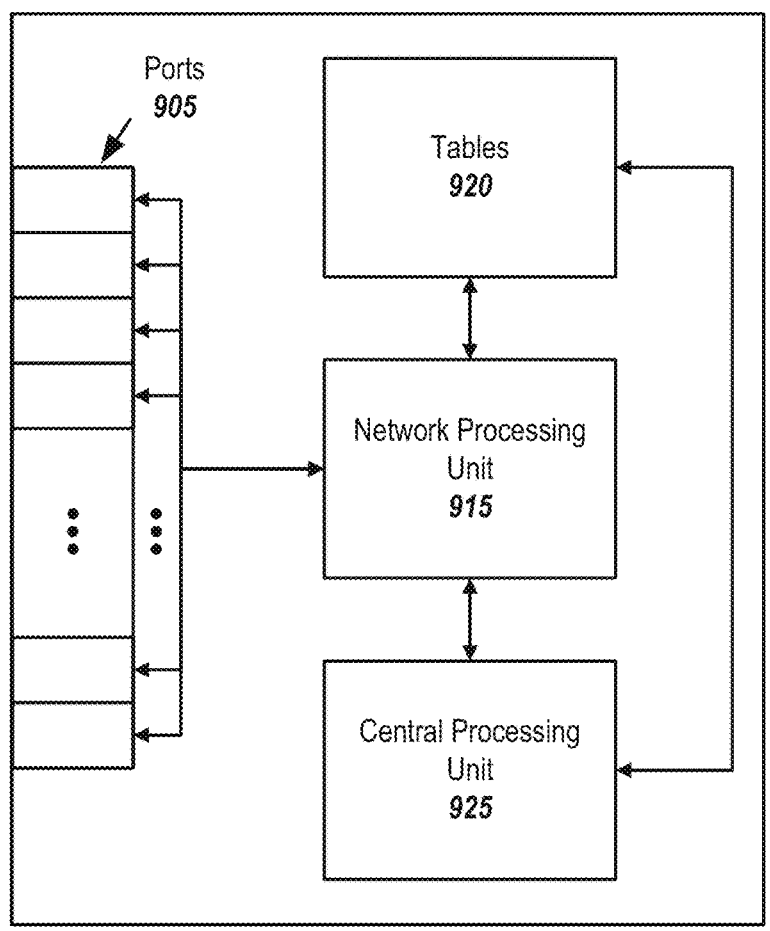
FIG. 9 depicts an alternative block diagram of an information handling system, according to embodiments of the present disclosure.

FIG. 9 depicts an alternative block diagram of an information handling system, according to embodiments of the present disclosure. It will be understood that the functionalities shown for system 900 may operate to support various embodiments of the present disclosure—although it shall be understood that such system may be differently configured and include different components, additional components, or fewer components.

The information handling system 900 may include a plurality of I/O ports 905, a network processing unit (NPU) 915, one or more tables 920, and a central processing unit (CPU) 925. The system includes a power supply (not shown) and may also include other components, which are not shown for sake of simplicity.

In one or more embodiments, the I/O ports 905 may be connected via one or more cables to one or more other network devices or clients. The network processing unit 915 may use information included in the network data received at the node 900, as well as information stored in the tables 920, to identify a next device for the network data, among other possible activities. In one or more embodiments, a switching fabric may then schedule the network data for propagation through the node to an egress port for transmission to the next destination.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implemented method for determining a trusted dynamic host configuration protocol (DHCP) server in a DHCP snooping environment, the method comprising:
 responsive to receiving at a DHCP information handling system a client message from a DHCP client:
  adding an indicator to the client message to indicate to a DHCP server, that is to receive the client message with the indicator, that the DHCP information handling system performs a check to verify if the DHCP server is a trusted device; and
  sending the client message with the indicator to the DHCP server; and
 responsive to receiving at the DHCP information handling system a reply message from the DHCP server:
  obtaining a received unique trusted identifier value from the reply message that was included by the DHCP server to verify status of the DHCP server;
  obtaining a generated unique trusted identifier value, which was generated using at least a master key and a unique identifier for the DHCP server as inputs into a cryptographic-related operation;
  comparing the received unique trusted identifier value to the generated unique trusted identifier value; and
  responsive to the received unique trusted identifier value matching the generated unique trusted identifier value, sending at least a portion of the reply message to the DHCP client.

2. The computer-implemented method of claim 1 further comprising:
 responsive to the received unique trusted identifier value not matching the generated unique trusted identifier value, taking one or more of the following actions comprising:
  deeming the DHCP server as an untrusted device;
  dropping the reply message received from the DHCP server;
  adding the DHCP server to a blacklist;
  creating an Access Control List (ACL) related to the DHCP server to block traffic intended for the DHCP server, originating from the DHCP server, or both;
  triggering an alarm regarding the DHCP server; and
  notifying a system administrator.

3. The computer-implemented method of claim 1 wherein the cryptographic-related operation is a hash function and wherein the step of obtaining a generated unique trusted identifier value, which was generated using at least a master key and a unique identifier for the DHCP server as inputs into a cryptographic-related operation comprises:

generating the generated unique trusted identifier value using a hash function and at least the master key and the unique identifier for the DHCP server as inputs to the hash function.

4. The computer-implemented method of claim 3 wherein the DHCP server generated the received unique value that it included in the reply message using the hash function and at least the master key and the unique identifier for the DHCP server as inputs to the hash function and the DHCP server and the DHCP information handling system were provisioned with the same hash function and the same master key.

5. The computer-implemented method of claim 4 wherein the unique identifier for the DHCP server is its Internet Protocol (IP) address.

6. The computer-implemented method of claim 1 further comprising:
   repeating the steps of claim 1 for that DHCP server in response to one or more conditions comprising:
      a verification schedule;
      as a result of a change in a network comprising the DHCP information handling system;
      reboot of the DHCP information handling system;
      update of the DHCP information handling system;
      with each communication intended for the DHCP server; and
      with a subset of communications intended for the DHCP server.

7. The computer-implemented method of claim 1 wherein the received unique trusted identifier value is included in an options field of the reply message.

8. A non-transitory computer-readable medium or media comprising one or more sequences of instructions which, when executed by at least one processor, causes steps to be performed comprising:
   responsive to receiving at a dynamic host configuration protocol (DHCP) information handling system a client message from a DHCP client:
      adding an indicator to the client message to indicate to a DHCP server, that is to receive the client message with the indicator, that the DHCP information handling system performs a check to verify if the DHCP server is a trusted device; and
      sending the client message with the indicator to the DHCP server; and
   responsive to receiving at the DHCP information handling system a reply message from the DHCP server:
      obtaining a received unique trusted identifier value from the reply message that was included by the DHCP server to verify status of the DHCP server;
      obtaining a generated unique trusted identifier value, which was generated using at least a master key and a unique identifier for the DHCP server as inputs into a cryptographic-related operation;
      comparing the received unique trusted identifier value to the generated unique trusted identifier value; and
      responsive to the received unique trusted identifier value matching the generated unique trusted identifier value, sending at least a portion of the reply message to the DHCP client.

9. The non-transitory computer-readable medium or media of claim 8 further comprising one or more sequences of instructions which, when executed by at least one processor, causes steps to be performed comprising:
   responsive to the received unique trusted identifier value not matching the generated unique trusted identifier value, taking one or more of the following actions comprising:
      deeming the DHCP server as an untrusted device;
      dropping the reply message received from the DHCP server;
      adding the DHCP server to a blacklist;
      creating an Access Control List (ACL) related to the DHCP server to block traffic intended for the DHCP server, originating from the DHCP server, or both;
      triggering an alarm regarding the DHCP server; and
      notifying a system administrator.

10. The non-transitory computer-readable medium or media of claim 8 wherein the cryptographic-related operation is a hash function and wherein the step of obtaining a generated unique trusted identifier value, which was generated using at least a master key and a unique identifier for the DHCP server as inputs into a cryptographic-related operation comprises:
   generating the generated unique trusted identifier value using a hash function and at least the master key and the unique identifier for the DHCP server as inputs to the hash function.

11. The non-transitory computer-readable medium or media of claim 10 wherein the DHCP server generated the received unique value that it included in the reply message using the hash function and at least the master key and the unique identifier for the DHCP server as inputs to the hash function and the DHCP server and the DHCP information handling system were provisioned with the same hash function and the same master key.

12. The non-transitory computer-readable medium or media of claim 8 further comprising one or more sequences of instructions which, when executed by at least one processor, causes steps to be performed comprising:
   repeating the steps of claim 8 for that DHCP server in response to one or more conditions comprising:
      a verification schedule;
      as a result of a change in a network comprising the DHCP information handling system;
      reboot of the DHCP information handling system;
      update of the DHCP information handling system;
      with each communication intended for the DHCP server; and
      with a subset of communications intended for the DHCP server.

13. The non-transitory computer-readable medium or media of claim 8 wherein the received unique trusted identifier value is included in an options field of the reply message.

14. A dynamic host configuration protocol (DHCP) information handling system comprising:
   one or more processors; and
   a non-transitory computer-readable medium or media comprising one or more sets of instructions which, when executed by at least one of the one or more processors, causes steps to be performed comprising:
      responsive to receiving at the DHCP information handling system a client message from a DHCP client:
         adding an indicator to the client message to indicate to a DHCP server that is to receive the client message with the indicator that the DHCP information handling system performs a check to verify if the DHCP server is a trusted device; and
         sending the client message with the indicator to the DHCP server; and
      responsive to receiving at the DHCP information handling system a reply message from the DHCP server:

obtaining a received unique trusted identifier value from the reply message that was included by the DHCP server to verify status of the DHCP server;

obtaining a generated unique trusted identifier value, which was generated using at least a master key and a unique identifier for the DHCP server as inputs into a cryptographic-related operation;

comparing the received unique trusted identifier value to the generated unique trusted identifier value; and responsive to the received unique trusted identifier value matching the generated unique trusted identifier value, sending at least a portion of the reply message to the DHCP client.

15. The DHCP information handling system of claim 14 wherein the non-transitory computer-readable medium or media further comprises one or more sequences of instructions which, when executed by at least one processor, causes steps to be performed comprising:

responsive to the received unique trusted identifier value not matching the generated unique trusted identifier value, taking one or more of the following actions comprising:

deeming the DHCP server as an untrusted device;

dropping the reply message received from the DHCP server;

adding the DHCP server to a blacklist;

creating an Access Control List (ACL) related to the DHCP server to block traffic intended for the DHCP server, originating from the DHCP server, or both;

triggering an alarm regarding the DHCP server; and notifying a system administrator.

16. The DHCP information handling system of claim 14 wherein the cryptographic-related operation is a hash function and wherein the step of obtaining a generated unique trusted identifier value, which was generated using at least a master key and a unique identifier for the DHCP server as inputs into a cryptographic-related operation comprises:

generating the generated unique trusted identifier value using a hash function and at least the master key and the unique identifier for the DHCP server as inputs to the hash function.

17. The DHCP information handling system of claim 16 wherein the DHCP server generated the received unique value that it included in the reply message using the hash function and at least the master key and the unique identifier for the DHCP server as inputs to the hash function and the DHCP server and the DHCP information handling system were provisioned with the same hash function and the same master key.

18. The DHCP information handling system of claim 16 wherein the unique identifier for the DHCP server is its Internet Protocol (IP) address.

19. The DHCP information handling system of claim 14 wherein the non-transitory computer-readable medium or media further comprises one or more sequences of instructions which, when executed by at least one processor, causes steps to be performed comprising:

repeating the steps of claim 14 for that DHCP server in response to one or more conditions comprising:

a verification schedule;

as a result of a change in a network comprising the DHCP information handling system;

reboot of the DHCP information handling system;

update of the DHCP information handling system;

with each communication intended for the DHCP server; and with a subset of communications intended for the DHCP server.

20. The DHCP information handling system of claim 14 wherein the received unique trusted identifier value is included in an options field of the reply message.

* * * * *